(12) United States Patent
Martini (10) Patent No.: US 12,478,051 B2
(45) Date of Patent: Nov. 25, 2025

(54) FISHING LURE AND METHODS OF MAKING AND USING SAME

(71) Applicant: Robert C. Martini, Southington, CT (US)

(72) Inventor: Robert C. Martini, Southington, CT (US)

(*) Notice: Subject to any disclaimer, the term of this patent is extended or adjusted under 35 U.S.C. 154(b) by 33 days.

(21) Appl. No.: 18/336,384

(22) Filed: Jun. 16, 2023

(65) Prior Publication Data

US 2024/0147975 A1    May 9, 2024

Related U.S. Application Data (60) Provisional application No. 63/353,272, filed on Jun. 17, 2022.

(51) Int. Cl.
*A01K 85/16*    (2006.01)
*A01K 85/00*    (2006.01)

(52) U.S. Cl.
CPC .......... *A01K 85/16* (2013.01); *A01K 85/1837* (2022.02)

(58) Field of Classification Search
CPC ........ A01K 85/16; A01K 85/00; A01K 85/18; A01K 85/1897
See application file for complete search history.

(56) References Cited

U.S. PATENT DOCUMENTS

| | | | |
|---|---|---|---|
| 954,691 A * | 4/1910 | Pflueger | A01K 85/16 43/42.34 |
| 1,471,280 A * | 10/1923 | Reekers | A01K 85/14 D22/129 |
| 1,987,839 A * | 1/1935 | Moilanen | A01K 85/14 43/42.04 |
| 2,189,958 A | 2/1940 | Middlemiss | |
| 2,503,672 A | 4/1950 | Johnson et al. | |
| 2,861,381 A | 11/1958 | Snyder | |
| 3,367,060 A * | 2/1968 | Abercrombie | A01K 85/16 D22/133 |
| 3,675,358 A | 7/1972 | Jones | |
| 4,199,888 A * | 4/1980 | Barnes | A01K 95/00 43/42.34 |
| 4,862,631 A * | 9/1989 | Wilson | A01K 85/16 43/42.33 |

(Continued)

FOREIGN PATENT DOCUMENTS

| | | | | |
|---|---|---|---|---|
| CA | 2380704 A1 | | 9/2003 | |
| CN | 101953325 A * | | 1/2011 | A01K 85/01 |

(Continued)

OTHER PUBLICATIONS

"Products." Vedoc Powder Coatings, Vedoc Powder Coatings, 2016, www.vedocpowdercoatings.co.za/products/ (Year: 2016).*

(Continued)

*Primary Examiner* — Peter M Poon
*Assistant Examiner* — Angelica Alejandra Almeida Bonnin
(74) *Attorney, Agent, or Firm* — UConn IP Law Clinic; Nadav Battat; Emily Tkac (57) ABSTRACT

A fishing lure is described comprising an elongated body having a density of about 5 to 7 g/cm3, the fishing lure containing 85% to 90% by weight zinc, 8% to 12% by weight aluminum, and no more than 5% by weight lead. In some cases, the lure contains no more than 3% by weight lead.

19 Claims, 12 Drawing Sheets

(56) References Cited

U.S. PATENT DOCUMENTS

| | | | | |
|---|---|---|---|---|
| 5,020,265 | A * | 6/1991 | Nuckols | A01K 85/14 43/42 |
| 5,279,065 | A | 1/1994 | Drury | |
| 5,588,248 | A * | 12/1996 | Cornell, Jr. | A01K 95/005 43/43.1 |
| 5,987,805 | A * | 11/1999 | Laney | A01K 85/00 43/43.13 |
| 6,082,037 | A * | 7/2000 | Malouf | A01K 85/00 43/42.32 |
| 6,205,697 | B1 * | 3/2001 | Kent | A01K 85/01 264/246 |
| 8,333,031 | B2 | 12/2012 | Carlson | |
| 2008/0229649 | A1 * | 9/2008 | Smith | B22F 5/10 29/592 |
| 2009/0277071 | A1 * | 11/2009 | Harris, Jr. | A01K 85/16 43/42.32 |
| 2012/0005946 | A1 | 1/2012 | Bennis | |
| 2022/0394962 | A1 * | 12/2022 | Medinas | A01K 85/12 |

FOREIGN PATENT DOCUMENTS

| | | | |
|---|---|---|---|
| EP | 0557321 B1 | 10/1994 | |
| ES | 2328197 A1 * | 11/2009 | A01K 95/005 |
| JP | 2001069891 A * | 3/2001 | |

OTHER PUBLICATIONS

Hornbaker, Michael, et al. "The Basics of Liquid and Powder Coatings." The Fabricators, The Fabricator, Nov. 5, 2013, www.thefabricator.com/thefabricator/article/finishing/the-basics-of-liquid-and-powder-coatings (Year: 2025).*

What is Powder Coating? https://www.powdercoating.org/page/WhatIsPC Jun. 8, 2023 (1 Page). (Year: 2023).*

1Pcs Fishing Lure Bails Leech Zinc Alloy 5g 10g 15g 20g 25g Gold Silver Hard Baits Spoon Baits Treble Hook Tackle Lure, o o https://www.wish.com/products/1pcs (3 Pages) Wish. (Year: 2023).*

Hogy Sand Eel, https://takwatermansurfnfish.com/products/hogy-sand-eel-jig, Jun. 8, 2023 (1 Page) Tak Waterman Fish. (Year: 2023).*

Mirrolure 17MR Mirrodine Suspending Twitchbait, https://www.tackledirect.com/mirrolure-mirrodine-suspending-twitchbait-17mr-html?mainc=m, Jun. 8, 2023 (5 Pages) TackleDirect (Year: 2023).*

Where to buy lead free tackle, https://www.pca.state.mn.us/air-water-land-climate/where-to-buy-lead-free-tackle. Sep. 28, 2023(44 Pages) Minnesota Pollution Central Agency (Year: 2023).*

Epoxy Powder Paint, https://barlowstackle.com/powder-paint/, Printed on Jun. 8, 2023, (3 pages), Barlow's Tackle.

Environnment Protection Zinc Alloy lead free in-line method Feeder,https://www.alibaba.com/product-detail/Environment-Protection-Zinc-All, Jun. 8, 2023, (13 Pages), Alibaba.

Lead Fish Lures, https://www.leadfreelures.com/—available as of 2021, Printed on Jun. 8, 2023, (6 Pages), Wildfish.

Zinc die casting fishing lures with titanizing, Printed on May 12, 2022, (1 Page), Global Sources.

Artificial Zinc Alloy Hard Fishing Lure Fish Shaped Bait Tackle with Treble Hook, Printed on May 12, 2022, (1 Page), Desert Cart.

* cited by examiner

At tip, diameter is .10

FISHING LURE AND METHODS OF MAKING AND USING SAME

CROSS-REFERENCE TO RELATED APPLICATIONS

This application claims the benefit of U.S. Provisional Patent Application No. 63/353,272 filed Jun. 17, 2022, the contents of which are incorporated by reference herein in their entirety.

BACKGROUND

This disclosure relates generally to the fishing industry, and more particularly to fishing lures.

In the fishing industry, almost all lures, jigs and sinkers are made of lead. When these fishing tools get lost in the oceans and lakes, they deteriorate over time and create toxins in our fisheries.

It would be useful to develop a fishing lure that would not be toxic to the ocean or lake if it were to remain there.

SUMMARY

One embodiment described herein is a fishing lure comprising an elongated body having a density of about 5 to 7 g/cm$^3$, the fishing lure containing 85% to 90% by weight zinc, 8% to 12% by weight aluminum, and no more than 3% by weight lead. In some cases the lure contains no more than 2% by weight lead, or no more than 1% by weight lead.

Another embodiment described herein is a fishing system, comprising a lure with an elongated body having a first end and a second end, the lure having a density of 5 to 7 g/cm$^3$, or 5.5 to 6.5 g/cm$^3$, and containing 85% to 90% by weight zinc, 8% to 12% by weight aluminum, and no more than 5% by weight lead, a hook component attached to the lure, and an elongated segment of a fishing line including a first end attached to the first end of the lure, and a second end attached to a fishing rod and reel.

Yet another embodiment is a method of fishing, comprising providing a lure with an elongated body having a first end and a second end, the lure having a density of 5 to 7 g/cm$^3$ and containing 85% to 90% by weight zinc, 8% to 12% by weight aluminum, and no more than 5% by weight lead, attaching a hook component to the lure, attaching fishing line to the first end of the lure, and moving the apparatus through the water to allow fish to chase the lure.

DETAILED DESCRIPTION

Fisheries are becoming more polluted and toxic largely due to lead sinkers and lures being lost at the bottom of a lake or ocean, eventually deteriorating into our waterways and fisheries. Traditionally, lead has been the metal of choice for sinkers and lures due to the low cost of lead, the low melting point for ease of casting, the plentiful supply, and its density. However, a number of states, including Minnesota, Oregon, Washington, Maine, New Hampshire, Vermont, New York, and Massachusetts, have legislation in place that prohibits the use of certain types of lead fishing tackle and/or ammunition, because these products are poisonous and fatal to waterfowl, fish, and other aquatic animals. Additionally, the presence of lead in fish can lead to health problems in humans who consume the fish.

The appearance and sound of a lure can impact the success in using the lure to attract fish. Large fish that feed on small fish typically locate their prey based upon shape, movement, sound, vibration, color, color contrast, smell, etc. Thus, a lure that has a shape, movement, sound, vibration, and/or color similar to that of real fish is likely to be effective in attracting large fish.

In order to overcome the toxicity of lead fishing lures left in the ocean, the embodiments disclosed herein are directed to a substantially lead-free fishing lure manufactured out of the zinc-aluminum alloy, such as ZA-12. ZA-12 has a density of approximately 6 g/cm$^3$ and contains approximately 88 wt % zinc, about 11 wt % aluminum, trace metals of tin, copper, magnesium, iron, and cadmium, and less than 1 wt % lead. According to the literature, ZA-12 is a zinc aluminum alloy comprised of 11.5% aluminum, 1.2% copper, and trace amounts of copper, iron, magnesium, lead, cadmium, and tin, with the remainder being zinc. ZA-12 is more expensive than lead, but it is still cost-effective, readily available, and its castability is acceptable for production in a graphite permanent mold process. The lure has a lead content of 0 wt % to 5 wt %, or 0.05 wt % to 3 wt Vo, or 0.1 wt % to 2 wt Vo, or 0.1 wt % to 1 wt %.

Lead has a density of about 9 gm/cm$^3$ and ZA-12 has a density of about 6 gm/cm$^3$, whereas other metals such as aluminum alone, are too light in comparison to the density of water. The substantially lead-free fishing lures described herein range in weight from about 30 grams to about 500 grams, or about 40 grams to about 400 grams, or about 50 to about 300 grams, and have a density of about 5 to 7 g/cm³. The lures range in length from about 70 mm to 300 mm, or about 100 mm to 280 mm, or about 120 mm to 260 mm. The lures range in width from about 5 mm to about 50 mm, or about 8 mm to about 35 mm, or about 10 mm to about 25 mm. The lures range in thickness from about 5 mm to 30 mm, or about 6 mm to about 26 mm, or about 8 mm to 22 mm. In embodiments, each lure may have about a 2 mm to 3 mm centered hole drilled through the body from the top to bottom on the head end to accommodate an 8 mm to 13 mm, or about 10 mm to 12 mm diameter first stainless-steel jump ring that is welded closed, with another 8 to 12 mm, or about 9 to 11 mm diameter solid (closed or split) second stainless-steel ring attached to the first ring. The second ring is configured to accommodate a hook component, such as an assist hook. The first end of the fishing line is attached to the 8 to 12 mm, or about 9 to 11 mm second ring, and the second end of the fishing line is attached to a reel of a fishing rod. In most cases, the fishing rod of choice is a jigging, spinning and/or slow-pitch fishing rod, which may be a parabolic in design. In embodiments, the fishing line includes a leader portion directly attached to the hook component. This system, including the fishing rod, fishing reel, fishing line, lure, hook component, is used to catch fish. In some cases in this application, the term "jig" refers to a type of lure that is dropped vertically into a body of water. In some cases in this application, the terms "lure" and "jig" are used interchangeably.

The dimensions of the lure can be proportional and representative of a sand eel ballyhoo and/or mackerel. The movement of the lure is based on a combination of geometry and hydrodynamics using elongated linear lines, flat planes, and radiuses on the edges and sides. The lure has rounded edges to reduce the resistance of the lure moving through the water. The shape of the lure allows it to rapidly move and dart side to side in the water, fluttering as it falls, to simulate a wounded fleeing baitfish.

The combined precise balance, weight distribution, and unique top-coated finish imitate the movements of a wounded fleeing baitfish. Baitfish are usually found in great quantities together and have a bright silvery iridescent color. This color combined with their quick movements and the reflection of sunlight creates a brilliant flashing effect in the water, which attracts predatory and pelagic gamefish.

The lure optionally includes one or more protective outer surface layers, such as a powder coating of a polymeric material such as a thermoplastic or thermoset material. The powder coating may be colored, either with a single color, or with a multi-color configuration. In some cases the powder coating comprises a UV-curable material. In many cases, the powder coating contains metallic particles of aluminum or another suitable metal. In some embodiments, a glow powder is included the powder coating. As a non-limiting example, a 50 micron non-encapsulated photoluminescent glow powder can be used in the powder coating. Other suitable coatings includes non-lead-containing metal coatings, including but not limited to a nickel-plated coating and/or a chrome-plated coating. The coating is selected to provide favorable corrosion resistance, wear resistance, and/or UV durability. The protective outer surface(s) optionally can be representative of, and consistent with, the color and flash of the baitfish. The ZA-12 alloy can benefit from a protective coating to help to prevent chipping, scratching and oxidation. The outer coating also can be configured to enhance the brilliance of the lure and help attract fish to the lure. In most cases, the protective outer surface is as smooth as possible so that the outer surface does not impede the hydrodynamics of the lure. The protective outer surface is sufficiently thin that it generally does not affect the weight of the lure.

In embodiments, the powder coating is an environmentally-friendly polymer powder resin that is sprayed onto a substrate that is electrostatically charged and then baked in an oven until fully cured and hardened. This type of coating is much more durable than traditional paints. The powder coating typically has a thickness in the range of 0.04 mm to 3 mm. In embodiments, the powder coating has a thickness in the range of about 2 mils (0.0508 mm) to about 4 mils (0.1016 mm), or about 2 mils (0.0508 mm) to about 3 mils (0.0762 mm) when dry. In some cases, the surface of the lure is roughened by abrasive blasting, such as sandblasting or the like, for etching a profile for better adhesion before the coating is applied. In embodiments, the powder coating is a thermoset material, such as a polyester or an epoxy-polyester hybrid material. In embodiments, the polyester is a tri glycidyl isocyanurate. In embodiments, the polyester is based on a hydroxyl alkyl amide hardener. In some cases, the powder coating is applied as an electrostatic spray onto a cold substrate, which is then cured for about 10 minutes at a temperature of about 375 Deg. F to 400 Deg. F.

Nickel plating is a process of electrolytically depositing a thin layer of nickel onto a substrate or a copper plated substrate. Nickel is very wear and corrosion-resistant, and it has a high brilliance that has a yellowish hue in the finish. In embodiments, the thickness of the nickel plating is about 3 microns to about 200 microns, or about 4 microns to about 170 microns, or about 5 microns to about 130 microns.

Chrome plating is the process of electroplating a thin layer of chromium onto a substrate. This process involves copper as a base, nickel, and then chromium. Chrome plating is also very wear and corrosion resistant, and it has a high brilliance that has a blueish hue in the finish. The thickness of the chrome plating is about 3 microns to about 200 microns, or about 4 microns to about 170 microns, or about 5 microns to about 130 microns.

The metal coating, such as nickel, chrome, or an alloy containing nickel and/or chrome, can be a metal oxide layer formed by an electrolytic process.

In some cases, the coating is a powder coating. In other cases, the coating is a metal coating. In some cases, the coating is multi-layer and includes in an inner metal coating, such as nickel and/or chrome, and an outer powder coating.

Generally, lead-containing lures are attractive due to their weight which helps the lure sink fast. Most substantially lead-free lures are lighter in weight, due to their slightly lighter density, making lead-free lures sink more slowly than a lead lure would, an undesirable effect for this application. However, the embodiments disclosed herein can be configured to sink as fast as a conventional lead lure. ZA-12 is not as dense as lead, but the rounded edges, the shape, and the balance and weight distribution of the lure help reduce water resistance allowing the lure to sink at a faster speed.

In one embodiment, the full length of the lure is about 175 mm. Based on length measurements, the center point between the first end and the second end of the lure is about 87 mm from either end. The weight center point, i.e., the weight balance point, is slightly ahead of the length center point, towards the first end of the lure where the hook component attaches. The weight balance point is about 76 mm from the first end, and 99 mm away from the second end. In embodiments, the balance point of the lure based on weight is located about 40% to 47%, or about 41% to 45% of the length of the lure from the first terminal end. In the embodiments shown in the photos, the weight balance point is located at about 42% to about 44% of the length of the lure from the first terminal end where the hook component attaches, and about 56% to about 58% from the second terminal end of the lure. In other embodiments, the hook component is not located at an end of the lure, but is instead located between about 10% and about 90%, or about 20% and about 80% of the distance from the head to the tail of the lure. In some cases, as is illustrated in FIG. 7C, the hook component, shown as 24', includes artificial hair 33, which is attractive to certain types of fish. In embodiments, the lure has a weight in the range of about 2 ounces to about 16 ounces, or about 4 ounces to about 12 ounces, or about 5 ounces to about 9 ounces.

The harmonics of a lead-containing fishing lure and a lead-free fishing lure differ. A lead-containing fishing lure makes a lower pitched sound when it hits the ocean bottom due to the softness of the metal, whereas a lead-free fishing lure, such as a lure comprising ZA-12, makes a higher pitched sound. The harmonics created by the lead-free fishing lure are an enticing curiosity factor, which could attract fish.

Figure 8:
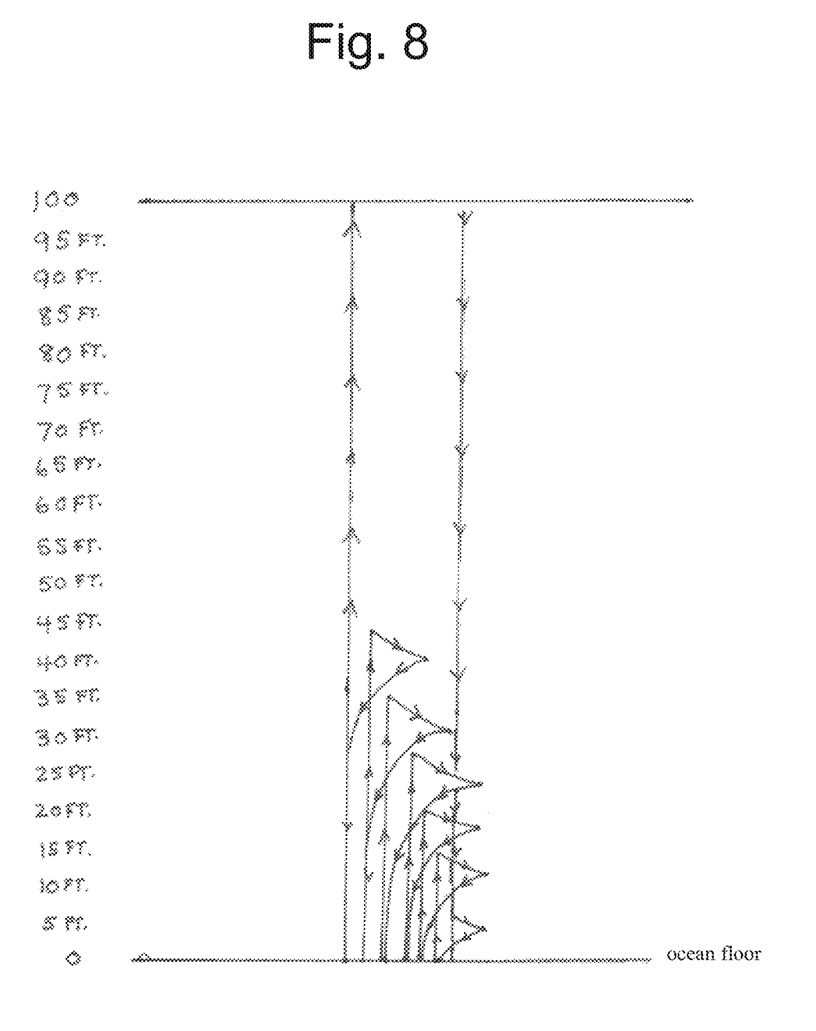
FIG. 8 shows a flow pattern of the first embodiment as it sinks in water.

Fishing equipment is abundant and a few different fishing methods are used, such as trolling, casting, bottom fishing, and using bait. However, some of the embodiments disclosed herein are designed to be specifically used for vertical jigging, and/or slow-pitch vertical jigging. When using specific jigging equipment, such as the jigs disclosed herein, and applying appropriate jigging methods, the combination of all these elements makes the disclosed embodiments move through the water column very quickly on their descent to the bottom and with their ascent up the water column, the vertical technique is used to work the jig. FIG. 8, which is described below, shows the flow pattern of one embodiment of a lure when used for vertical jigging. In some embodiments, the lure is a casting lure.

FIG. 8 is a drawing illustrating the flow pattern of the first embodiment of the fishing lure 10. The flow pattern illustrates how the lure moves through a water column after it is dropped vertically. The lure is released and bailed from the fishing reel and makes its descent to the ocean floor. With vertical or slow-pitch jigging, as soon as contact is made with the ocean floor, the lure is reeled up in small incremental movements where, if a parabolic fishing rod is used, the parabolic design of the rod helps with the lure's erratic movement. The lure comes up headfirst until it is in the first desired stop position. After jigging the rod up and down vertically, a quick darting action happens in which the lure darts tail first down to the side at approximately a 45-degree angle before coming to almost a neutral horizontal position where at this point an erratic flutter happens. Then the heavier head end of the lure takes over and then the lure descends head first very quickly back down to the ocean floor. This process of working the jig is repeated at different depths of the water column. This darting action is also representative of how a squid moves through the water, which is also another very sought-after baitfish for predators. The erratic fluttering, darting and rapid movements of this lure are likewise representative of a wounded fleeing baitfish.

Figure 1:
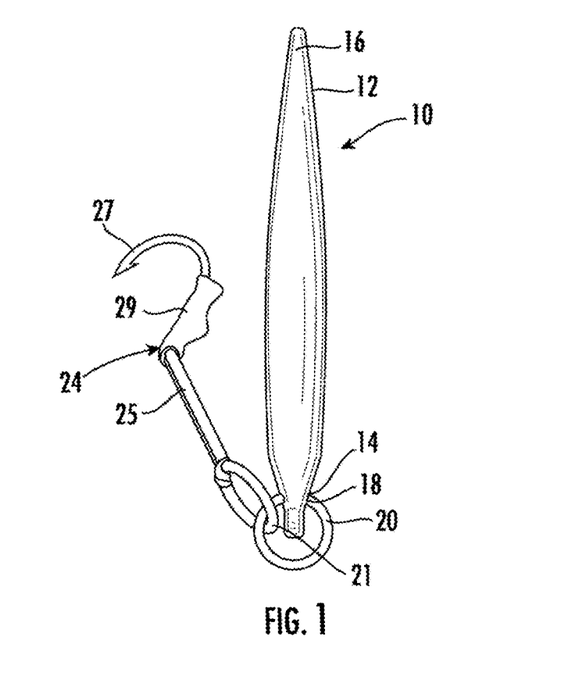
FIG. 1 shows a side perspective view of first embodiment viewed from forward end with a hook component attached thereto.

FIG. 1 shows a perspective view of the first embodiment of a fishing lure 10 from the forward end. The head portion 14 of the solid body 12 is shown. A first ring 20 is shown protruding out of the nose or head portion 14. A second ring 21 is attached to the first ring 20. In embodiments, the second ring 21 is attached to the first ring 20 by welding the first ring 20 closed around the second ring 21, or welding the second ring 21 around the first ring 20. In some embodiments, only a single ring 20 is used. While two solid rings are shown in FIG. 1, one or both of the rings can be split rings. The solid body 12 is extending away from the head portion 14 towards the tail portion 16 of the solid body 12. The first ring 20 can be an attachment point for fishing line. The rings 20 and 21 optionally also can be used as an attachment point for a hook component 24, such as an assist hook or another suitable hook. In the embodiment shown in FIG. 1, the hook component 24 is an assist hook that includes a hook-shaped portion 27, and a coupling portion 25 that couples the hook-shaped portion 27 to the first ring 20. The coupling portion 27 can be made from a variety of materials, such as metal wire, or a synthetic cord or rope. Non-limiting examples of synthetic materials that can be used to make the coupling portion 25 include an aramid fiber such as Kevlar®, a polyethylene fiber such as Spectra®, which is an ultra high molecular weight polyethylene made by Honeywell®, or Dyneema®, which is an ultra high molecular weight polyethylene made by DSM™. The coupling portion 25 can be looped through the second ring 21, or through the first ring 20. A protective sleeve 29 optionally covers the connection between the coupling portion 25 and the adjacent part of the hook-shaped portion 27.

Figure 2:
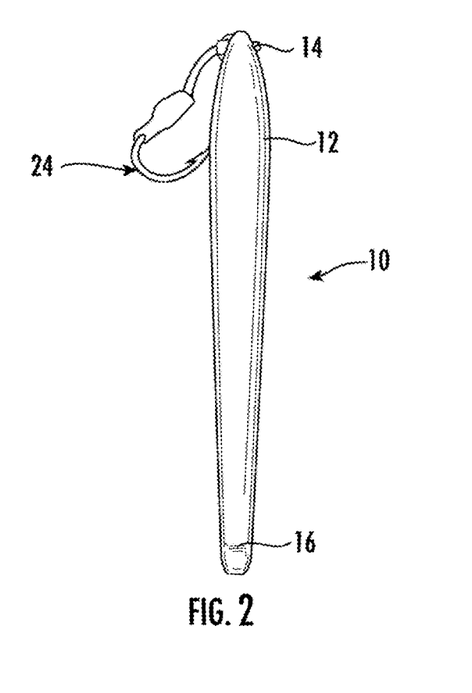
FIG. 2 shows a side view of first embodiment viewed from rearward end.

FIG. 2 shows a perspective view of the first embodiment of the lure 10 from the rearward end. The tail portion 16 of the solid body 12 is shown. The solid body 12 is extending away from the tail towards the head portion 14 of the solid body 12.

Figure 3A:
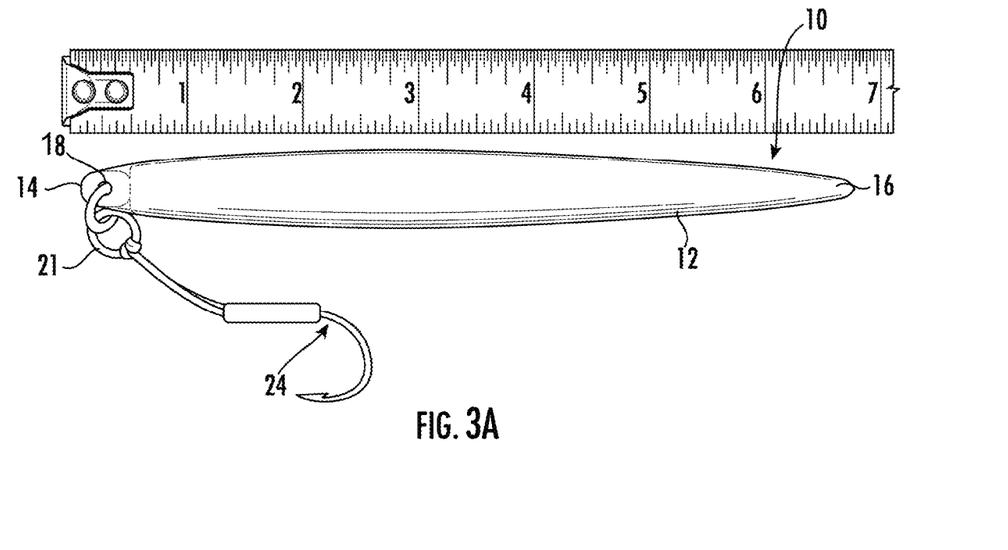
FIG. 3A is a photo of a top view of the first embodiment.

FIG. 3A shows a photo of the top view of the lure 10. The solid body 12 narrows to symmetrical rounded points on the head portion 14 and tail portion 16. A second ring 21 is attached to the first ring 20. The hook component 24 can optionally be attached to the second ring 21.

Figure 3B:
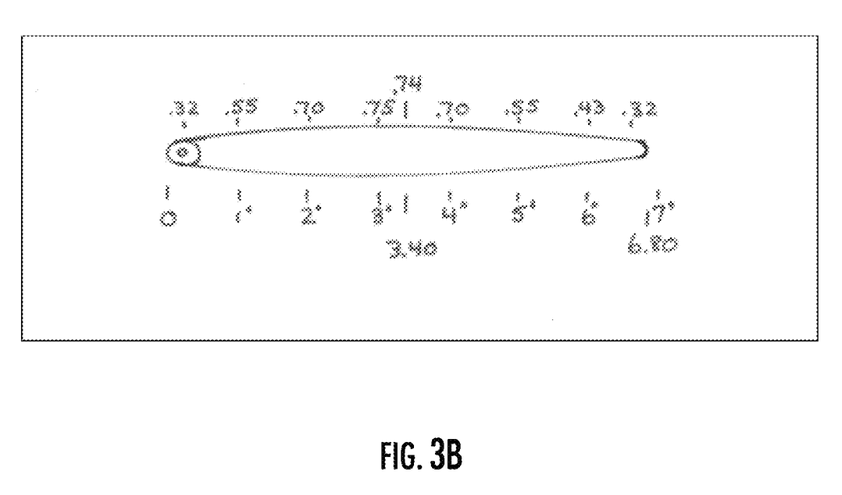
FIG. 3B shows a sketch of a top view of the first embodiment.

FIG. 3B shows a sketch of a top view of the first embodiment. The bottom view looks the same as the top view. The width of the curved solid body 12 is shown at 1 inch increments from the head end to the tail end. As can be seen in the figure, the width tapers from the middle toward each end. The widest part of the lure is located about 3 inches from the terminal end of the head portion and this width is about 0.75 inches for a lure that has a length of about 6.8 inches. The numbers above and beside the lure are widths. Numbers below the lure indicates the length in inches from the head terminal end of the left side of the drawing. The length center is at 3.40 inches. The lure has a weight of 5 ounces.

Figure 4A:
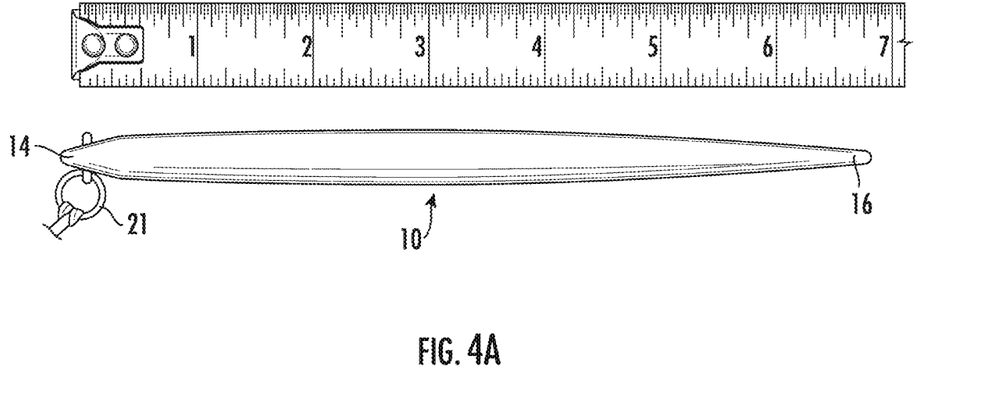
FIG. 4A is a photo of a side view of the first embodiment.
Figure 4B:
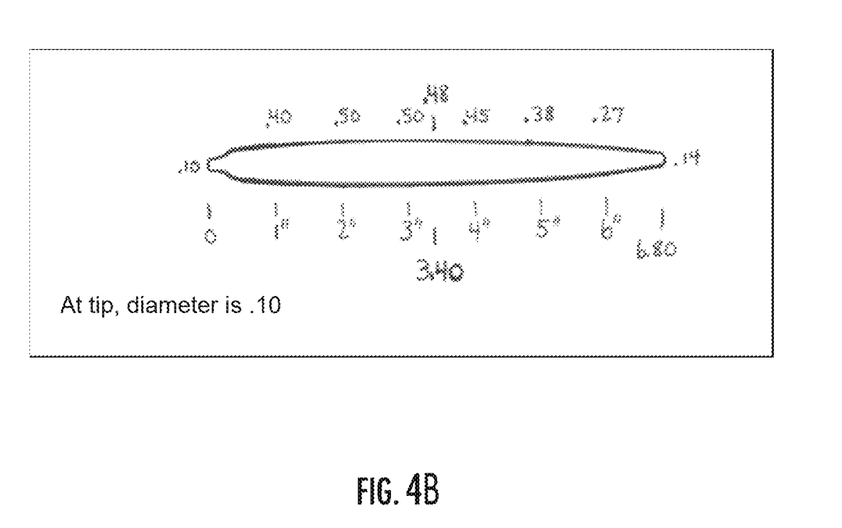
FIG. 4B shows a sketch of a side view of the first embodiment.

FIG. 4A shows a photo of a side view of the lure 10. The solid oblong body 12 narrows to symmetrical rounded points on the head portion 14 and tail portion 16 of the solid body 12. The first ring 20 is shown protruding out of the head portion 14. The second ring 21 is attached to the first ring 20. The hook component 24 is attached to the second ring 21. FIG. 4B shows a sketch of a side view of the first embodiment. As can be seen in the figure, the width tapers from the middle toward each end. The thickest part of the lure is about 3 inches from the terminal end of the head portion, and this thickness is about 0.5 inches for a lure that has a length of about 6.8 inches. Thicknesses in inches are provided at various points along the length of the lure. Numbers above and beside the lure are thicknesses. Numbers below the lure indicate the length in inches from the head terminal end on the left side of the drawing.

Figure 5:
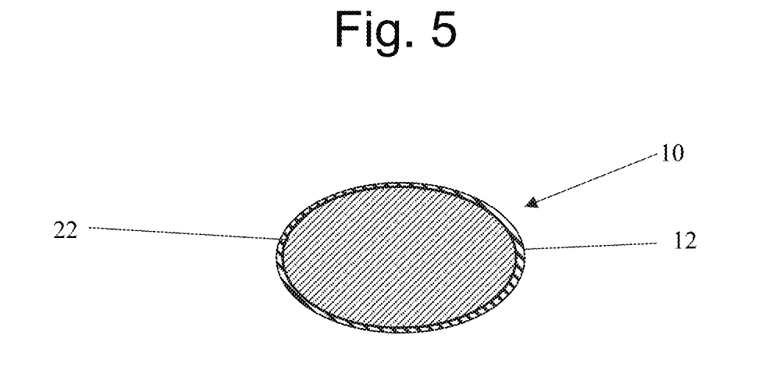
FIG. 5 schematically shows a cross-sectional view of the first embodiment in the width direction.
Figure 6:
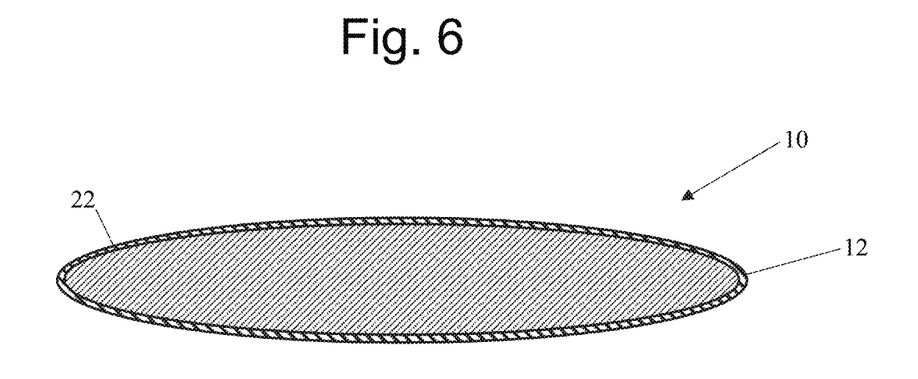
FIG. 6 schematically shows a cross-sectional view of the first embodiment in the length direction.

FIG. 5 shows a cross-sectional view of the lure 10 in the direction of width. The solid metal body 12 is encased by a coating 22. The coating may be a powder coating, a nickel-plated coating, a chrome-plated coating, or another suitable coating that prevents deterioration of the lure 10 when it is exposed to salt water and/or fresh water and/or UV light for a prolonged period of time. In the embodiment shown in the figures, the coating has a thickness in the range of about 0.5 mm to about 3 mm. FIG. 6 shows a cross-sectional view taken of lure 10 in the direction of length.

Figure 7A:
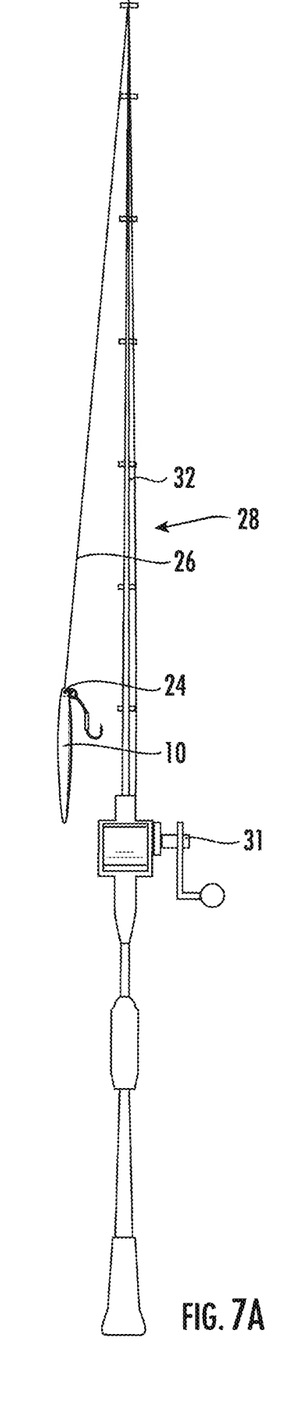
FIG. 7A is a photo of the first embodiment connected to a hook component, line, and pole.
Figure 7B:
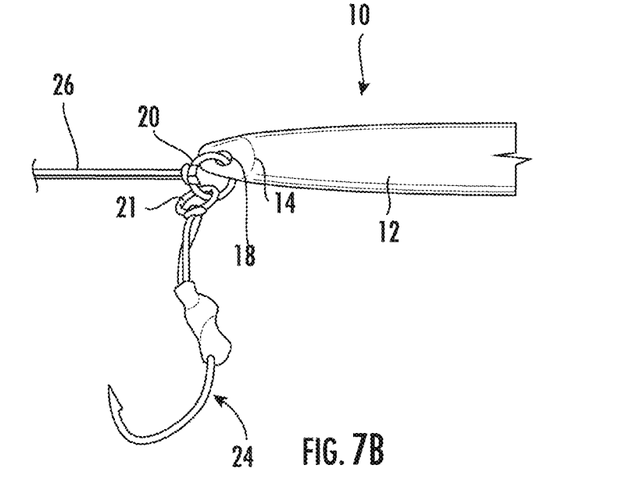
FIG. 7B shows a photo of the forward end of the first embodiment with fishing line attached thereto.
Figure 7C:
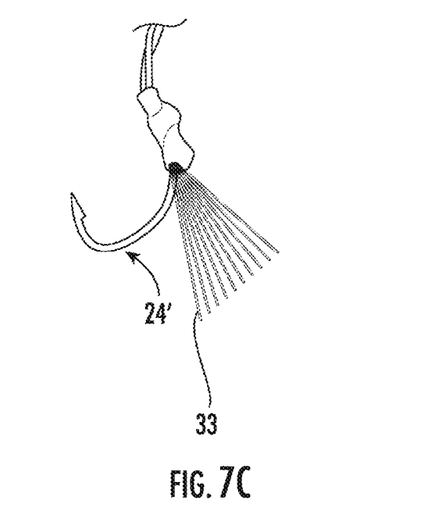
FIG. 7C shows an alternative version of a hook that can be used with the first embodiment.

FIG. 7A shows the first embodiment of the fishing lure 10 connected to a fishing line 26 and fishing pole 28 that includes a reel 31. A hook component 24 is optionally attached to the lure 10. FIG. 7B shows a photo of the head portion 14 of the lure 10. The head portion 14 has a small hole 18 drilled through the body 12 to house a first ring 20. A second ring 21 is attached to the first ring 20. A hook component 24 is shown here attached to the second ring 21. The fishing line 26 is attached to the first ring 20 and to a fishing reel 31. In some cases, the portion of the fishing line 26 that is attached to the first ring 20 is a leader material made monofilament and/or fluorocarbon which in turn is attached to a braid or other type of fishing line.

Figure 9:
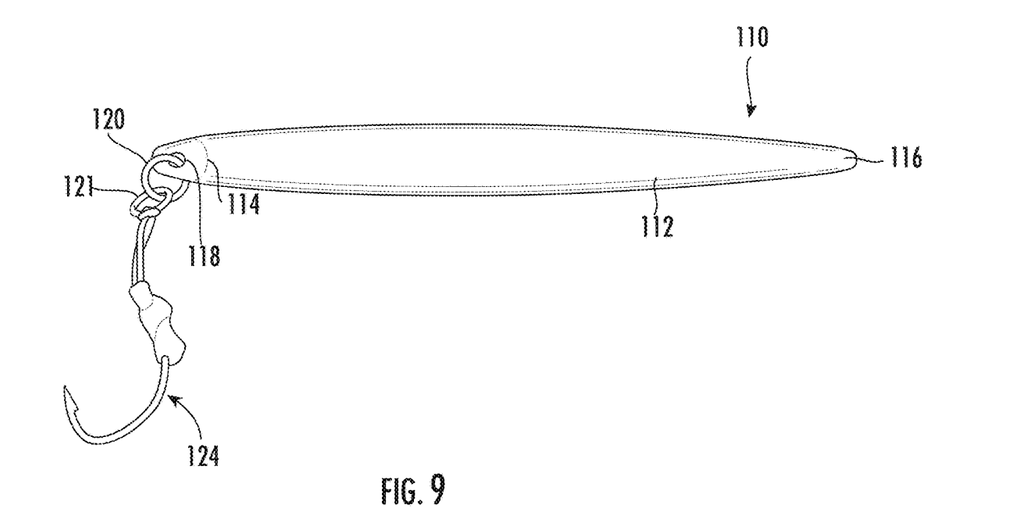
FIG. 9 shows a top view of a second embodiment.

FIG. 9 shows a top view of a second embodiment of a fishing lure 110. The second embodiment is a lure without a coating. The head portion 114 of the solid body 112 is shown. A small hole 118 is drilled through the head portion 114 of the metal body 112. A first ring 120 is shown protruding out of the head portion 114, going through the hole 118. A second ring 121 is attached to the first ring 120. A hook component 124 is optionally attached to the second ring 121.

Figure 10:
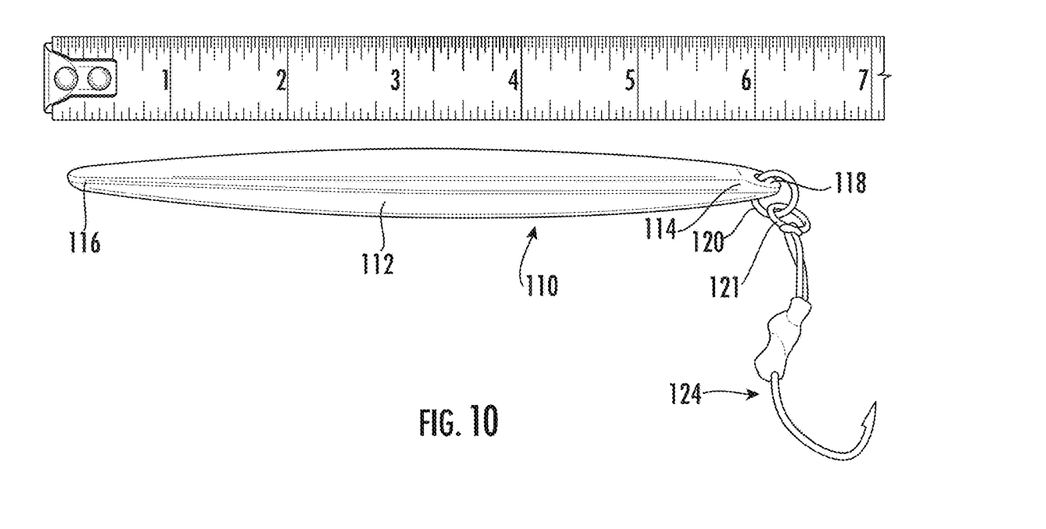
FIG. 10 shows a side view of the second embodiment.

FIG. 10 shows a side view of the second embodiment 110. The solid oblong body 112 narrows to rounded points on the head portion 114 and tail portion 116 of the solid body 112. An aperture 118 is formed through the head portion 114 of the oblong body 112. A first ring 120 goes through the aperture 118. A second ring 121 is attached to the first ring 120. A hook component 124 is optionally attached to the second ring 121.

Figure 11:
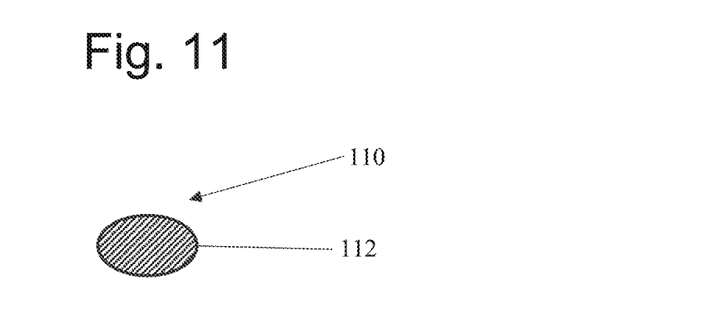
FIG. 11 schematically shows a sectional view of a second embodiment in the width direction with a hook component attached.
Figure 12:
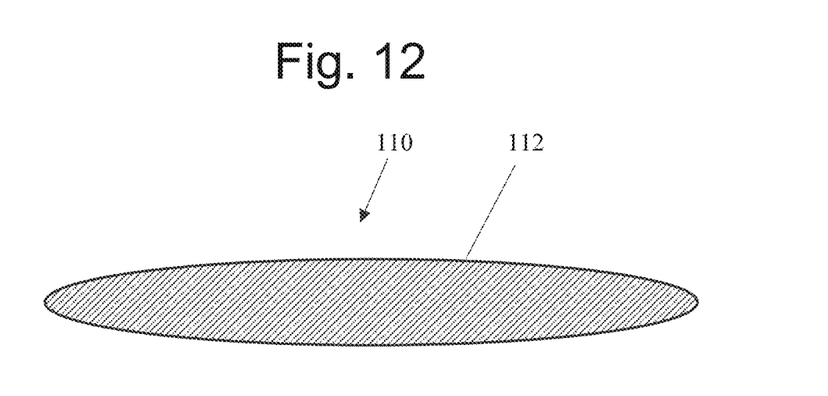
FIG. 12 schematically shows a sectional view of the second embodiment in the lengthwise direction.

FIG. 11 schematically shows a sectional view of the second embodiment 110 in the width direction showing the solid metal body 112. FIG. 12 schematically shows a sectional view of the second embodiment 110 in the length direction.

Figure 13:
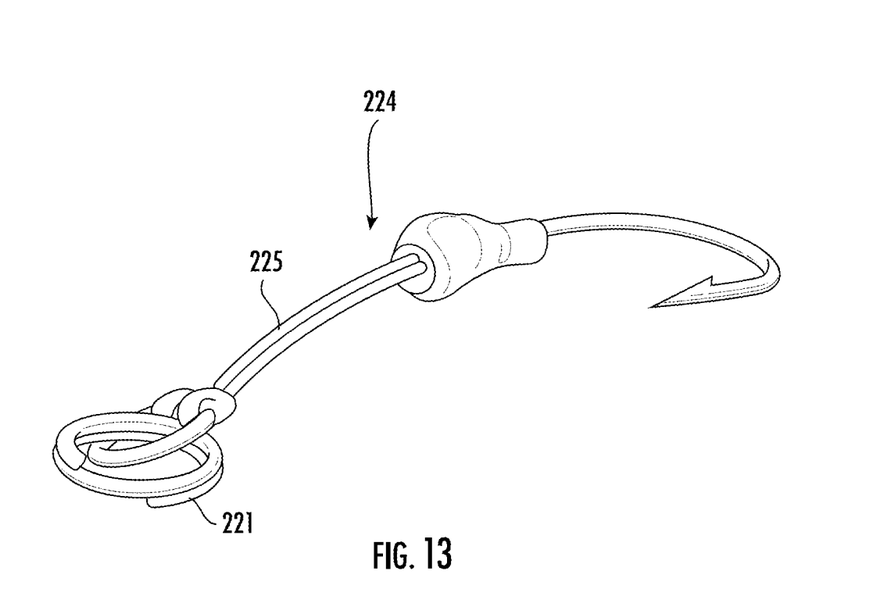
FIG. 13 shows an embodiment of an assist hook that includes a split ring.

Various types of rings can be used in conjunction with the lure. One alternative embodiment is shown in FIG. 13. In this configuration, an assist hook 224 includes a split ring 221 attached to a coupling portion 225 of the assist hook 224. The split ring 221 is configured to be attached to a ring that is connected to a lure. In other embodiments (not shown) the first ring 20, 120, which is directly connected to the lure, is a split ring. In most cases, rings 20, 120, 21, 121 and 221 are formed from a metal, such as stainless steel.

Figure 14A:
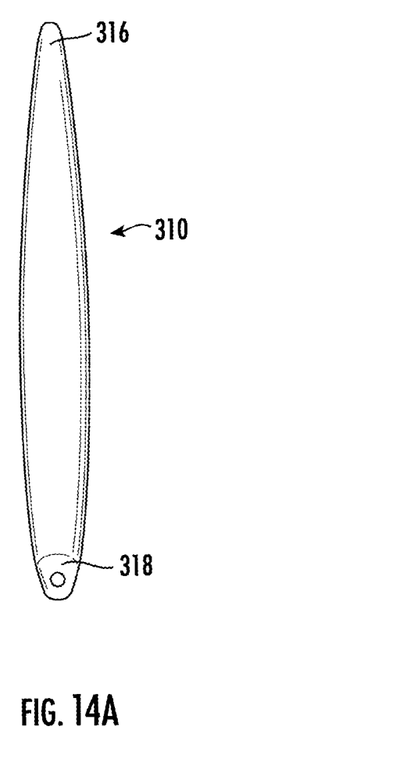
FIG. 14A shows a top view of a third embodiment.
Figure 14B:
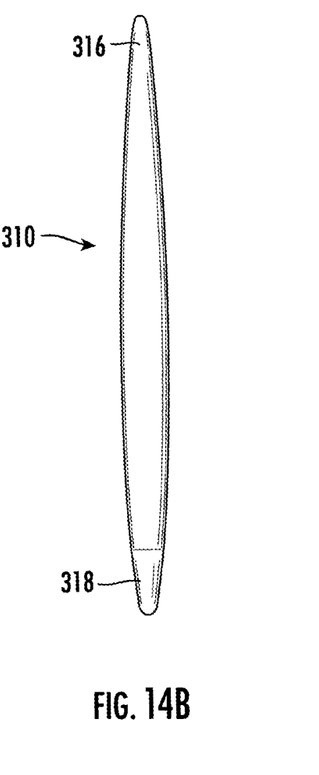
FIG. 14B shows a side view of the third embodiment.
Figure 14C:
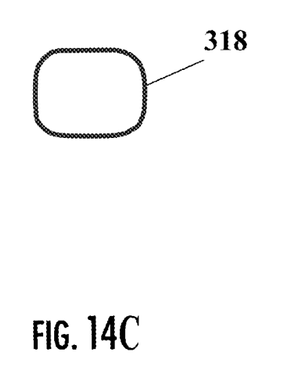
FIG. 14C shows a front end view of the third embodiment.
Figure 14D:
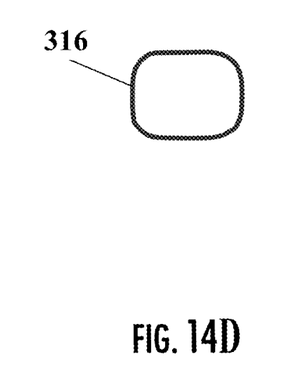
FIG. 14D shows a rear end view of a third embodiment.

FIG. 14A shows a top view of a third embodiment of a lure, designated as 310, that is similar to the first embodiment but is smaller. This embodiment has a head portion 318 and a tail portion 316. FIG. 14B shows a side view, FIG. 14C shows a front end view, and FIG. 14D shows a rear end view of the third embodiment.

Figure 15:
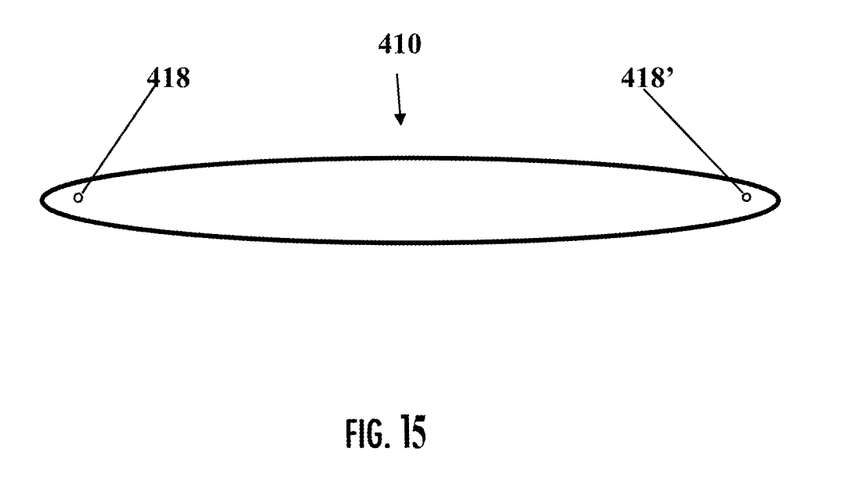
FIG. 15 shows a top view of a fourth embodiment.

FIG. 15 shows a top view of a fourth embodiment of a lure, designated as 410, that is similar to the first embodiment except that this embodiment has an aperture 418, 418' at each of the two opposite longitudinal ends. One optional use of the second aperture would be to support a second hook.

Figure 16:
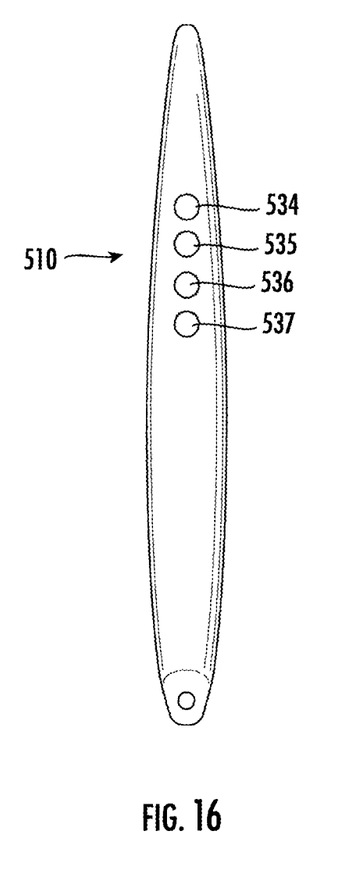
FIG. 16 shows a top view of a fifth embodiment.

FIG. 16 shows a top view of the fifth embodiment of a lure, designated as 510, that is similar to the first embodiment except that it has several small holes 534, 535, 536, and 537 in the center of the lure 510 toward the tail end. The holes 534, 535, 536, and 537 create air bubbles when the lure 510 is used. In the version shown FIG. 16, on a lure that is 7 inches long, the holes 534, 535, 536 and 537 can be positioned 4, 4⅓, 4⅔ and 5 inches from the front terminal end of the lure.

Example 1—Decibel Test

A 5-ounce uncoated lure having the relative dimensions of the first embodiment was made from an alloy that contained about 87.3 wt % zinc, 11.5 wt % aluminum, 1.2 wt % copper, and trace amounts of copper, iron, magnesium, lead, cadmium, and tin. A sound test was run using this zinc alloy lure in comparison to a lead lure that had a weight of 8 ounces and was about 60% as long as the zinc alloy lure. Each lure was held in a vertical directions and dropped from a height of about 4 inches (measured from the lower end of the lure) onto a tile floor. Decibel readings were taken using a Tadeto® s1720 sound level meter. In the first test, the zinc alloy lure had a decibel reading of 110.3 dBA and the lead lure had a decibel reading of 75.7 dBA. In the second test, the zinc alloy lure had a decibel reading of 86.8 dBA and the lead lure had a reading of 75.3 dBA. In the third test, the zinc alloy lure had a reading of 87.2 dBA and the lead lure had a reading of 77.9 dBA. The zinc alloy lure had a higher pitch sound than the lead lure. The qualitative pitch of the zinc alloy lure was a "clang" while the pitch of the lead lure was a "thud." A loud and high pitched (higher frequency) sound is alluring to fish and thus the zinc alloy lure is more appealing to fish than a lead lure when the lure lands on the ocean floor.

A number of alternatives, modifications, variations, or improvements therein may be subsequently made by those skilled in the art, which are also intended to be encompassed by the following claims.

What is claimed is:

1. A fishing lure comprising:
   an elongated body having a first end and a second end, the elongated body having a density of 5 to 6.5 g/cm$^3$ and containing 85% to 90% by weight zinc, 8% to 12% by weight aluminum, 1% to 2% by weight copper, and no more than 1% by weight lead, and
   an outer protective powder coating formed on the elongated body, the outer protective powder coating comprising at least one of a thermoplastic material and a thermoset material.

2. The fishing lure of claim 1, wherein the first end includes a hole.

3. The fishing lure of claim 2, wherein a first ring is inserted through the hole in the first end.

4. The fishing lure of claim 3, wherein a second ring is attached to the first ring.

5. The fishing lure of claim 4, wherein a hook component is attached to the second ring on the first end.

6. The fishing lure of claim 4, wherein a fishing line is attached to the first ring.

7. The fishing lure of claim 1, wherein the elongated body further contains trace metals of tin, magnesium, iron and cadmium that together comprise less than 1% by weight.

8. The fishing lure of claim 1, wherein the elongated body has an oblong shape with rounded edges, and a weight balance point forward from a center point based on length.

9. The fishing lure of claim 1, wherein the outer protective powder coating further comprises a metal.

10. The fishing lure of claim 1, wherein the elongated body is configured such that a movement of the fishing lure in water simulates a movement of a wounded fleeing baitfish.

11. The fishing lure of claim 1, wherein the elongated body has a density of at least 5.5 g/cm$^3$.

12. The fishing lure of claim 1, wherein the fishing lure makes a higher-pitched sound when dropped on a surface than a fishing lure of the same size, including length, width, and thickness, that predominantly contains lead.

13. The fishing lure of claim 1, wherein the fishing lure is configured to be used without additional weight.

14. The fishing lure of claim 1, wherein the lure has a length, and a weight balance point is located about 43% away from the first end of the lure along the length of the lure.

15. The fishing lure of claim 1, further including an inner metal coating beneath the outer protective powder coating.

16. The fishing lure of claims 1, wherein the outer protective powder coating has a thickness in the range of 2 mils to 4 mils.

17. A fishing lure comprising:
   an elongated body having a first end and a second end, the elongated body having a density of 5 to 6.5 g/cm$^3$ and containing 85% to 90% by weight zinc, 8% to 12% by weight aluminum, and no more than 1% by weight lead, and
   an outer protective powder coating formed on the elongated body, the outer protective powder coating comprising at least one of a thermoplastic material and a thermoset material.

18. The fishing lure of claim 17, wherein the elongated body further contains trace metals of tin, copper, magnesium, iron, and cadmium.

19. The fishing lure of claim 17, further including an inner metal coating beneath the outer protective powder coating.

* * * * *